United States Patent
Su et al.

(10) Patent No.: US 10,644,781 B2
(45) Date of Patent: May 5, 2020

(54) ANALOG CHANNEL MEASUREMENT METHOD AND BASE STATION

(71) Applicant: China Academy of Telecommunications Technology, Beijing (CN)

(72) Inventors: Xin Su, Beijing (CN); Yang Song, Beijing (CN); Chuanjun Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/066,506

(22) PCT Filed: Sep. 12, 2016

(86) PCT No.: PCT/CN2016/098761
§ 371 (c)(1),
(2) Date: Jun. 27, 2018

(87) PCT Pub. No.: WO2017/113885
PCT Pub. Date: Jul. 6, 2017

(65) Prior Publication Data
US 2018/0367206 A1  Dec. 20, 2018

(30) Foreign Application Priority Data
Dec. 28, 2015 (CN) .......................... 2015 1 1001485

(51) Int. Cl.
*H04L 1/02* (2006.01)
*H04L 17/00* (2006.01)
(Continued)

(52) U.S. Cl.
CPC ......... *H04B 7/0695* (2013.01); *H04B 7/0413* (2013.01); *H04B 7/0617* (2013.01);
(Continued)

(58) Field of Classification Search
CPC .. H04B 7/0695; H04B 7/0413; H04B 7/0617; H04B 7/0802; H04B 7/088; H04L 5/0048; H04L 25/0206
(Continued)

(56) References Cited

U.S. PATENT DOCUMENTS

2013/0039445 A1* 2/2013 Hwang ................ H04B 7/0617
375/316
2014/0341310 A1  11/2014 Rahman et al.
(Continued)

FOREIGN PATENT DOCUMENTS

| CN | 101335966 A | 12/2008 |
|---|---|---|
| CN | 101662817 A | 3/2010 |
| WO | WO2015065154 A1 | 9/2016 |

OTHER PUBLICATIONS

Shuangfeng Han et al., "Large-Scale Antenna Systems with Hybrid Analog and Digital Beamforming for Millimeter Wave 5G," IEEE Comm. Magazin, Jan. 2015, p. 186-194.*
(Continued)

*Primary Examiner* — Tesfaldet Bocure
(74) *Attorney, Agent, or Firm* — Foley & Lardner LLP

(57) ABSTRACT

Disclosed are an analog channel measurement method and a base station, for use in implementing measurement of an analog channel in a digital-analog hybrid beamforming system. The method is such that: a base station receives a reference signal, where the base station comprises a digital-analog hybrid beamforming antenna system, and the digital-analog hybrid beamforming antenna system comprises digital channels and analog channels; the base station selects an analog channel group from an analog channel group set on the basis of the reference signal and employs the reference signal in measuring each analog channel of the selected analog channel group, where the number of analog channels that each analog channel group comprises is equal to the
(Continued)

number of digital channels in the digital-analog hybrid beamforming antenna system.

20 Claims, 4 Drawing Sheets

(51) Int. Cl.
    *H04B 7/06*     (2006.01)
    *H04B 7/08*     (2006.01)
    *H04L 25/02*     (2006.01)
    *H04B 7/0413*     (2017.01)
    *H04L 5/00*     (2006.01)

(52) U.S. Cl.
    CPC ........... *H04B 7/0802* (2013.01); *H04B 7/088* (2013.01); *H04L 5/0048* (2013.01); *H04L 25/0206* (2013.01); *H04L 25/0224* (2013.01)

(58) Field of Classification Search
    USPC ........ 375/267, 297, 347, 377, 358; 370/328, 370/329, 330, 340, 341; 455/101, 132
    See application file for complete search history.

(56) References Cited

U.S. PATENT DOCUMENTS

2015/0180568 A1* 6/2015 Motoyoshi ......... H04B 7/18582
                                        370/316
2016/0344463 A1* 11/2016 Kim .................... H04B 7/0456

OTHER PUBLICATIONS

DSP/RF/FPGA boards, combined with industry-leading LTE UE, "Hybrid Beamforming basics | Hybrid Beamforming types," RF wireless world, retrieved on Jun. 19, 2019, six pages. Source: http://www.rfwireless-world.com/Terminology/Hybrid-Beamforming-basics-and-Hybrid-Beamforming-types.html.*

"LTE Release 12 and Beyond," Takehiro Nakamura, 3GPP TSG-RAN, NTT DOCOMO, Dec. 31, 2013 (Dec. 31, 2013), pp. 1-11.

* cited by examiner

--Prior Art--

ANALOG CHANNEL MEASUREMENT METHOD AND BASE STATION

This application is a National Stage of International Application No. PCT/CN2016/098761, filed Sep. 12, 2016, which claims priority to Chinese Patent Application No. 201511001485.7, filed Dec. 28, 2015, both of which are hereby incorporated by reference in their entireties.

FIELD

The present invention relates to the field of communications, and particularly to a method for measuring an analog channel, and a base station.

BACKGROUND

Since the Multiple Input Multiple Output (MIMO) technologies are important to an improvement of a peak rate, and a utilization ratio of system spectrums, all the radio access technology standards of Long Term Evolution (LTE), LTE-Advanced (LTE-A), etc., are built based upon the MIMO plus Orthogonal Frequency Division Multiplexing (OFDM) technologies. A performance gain of the MIMO technologies arises from a spatial freedom available in a multi-antenna system and a larger amount of data are transmitted due to the spatial freedom, so one of the most important evolvements of the MIMO technologies being standardized is an extension of dimensions.

In the LTE Release 8 (Rel-8), MIMO transmission of at most four layers can be supported. In the LTE Rel-9, primarily the Multi-User MIMO (MU-MIMO) technologies are enhanced, and at most four downlink transmission data layers can be supported in MU-MIMO transmission of the Transmission Mode (TM)-8. In the LTE Rel-10, an 8-port Channel State Information-Reference Signal (CSI-RS), a User Equipment (UE)-specific Reference Signal (URS), and a multi-granularity codebook have been introduced to further improve a spatial resolution of channel state information, and to further extend a transmission capacity of Single-User MIMO (SU-MIMO) to at most 8 transmission data layers.

In a base station antenna system structured as a Passive Antenna System (PAS), a plurality of antenna ports are arranged horizontally, where each antenna port corresponds to a separate radio frequency-intermediate frequency-baseband channel, and a plurality of array elements in a vertical dimension corresponding to each antenna port are connected through a radio frequency cable. Thus with the existing MIMO technologies, only spatial characteristics of signals of respective UEs in a horizontal dimension can be optimized by adjusting relative amplitudes and/or phases between the different ports in the horizontal dimension, and only uniform sector-level beam-forming can be made in the vertical dimension. After the Active Antenna System (AAS) technologies have been introduced to a mobile communication system, the base station antenna system can be provided with a higher freedom in the vertical dimension, and can optimize a signal at a UE level in the three-dimension space.

The MIMO technologies are being further advanced in the industry toward becoming three-dimensional and large-scale. There is a research project ongoing in the $3^{rd}$ Generation Partnership Project (3GPP) on Three-Dimension (3D) channel modeling, and there are also researches and standardization efforts to be conducted as expected on the technologies of Elevation Beam Forming (EBF) of eight or less antenna ports, and Full Dimension MIMO (FD-MIMO) of more than eight ports (e.g., 16, 32, or 64). Researches and test efforts have been conducted from the foresighted perspective in the academic community on the massive MIMO technologies based upon a larger scale array of antennas (including one or more hundreds and even more array elements). The academic researches, and the results of the preliminary channel in situ measurements have showed that the massive MIMO technologies can greatly improve the utilization ratio of system bands, and support a larger number of accessing UEs, so the massive MIMO technologies are expected by the major research organizations to be one of the most promising physical layer technologies in a next generation mobile communication system.

The massive MIMO technologies are required to be applied to a massive array of antennas. Although the spatial resolution can be maximized, and the MU-MIMO performance can be optimized, using a fully-digital array, this structure necessitates a large number of Analog-Digital (AD)/Digital-Analog (DA) conversion elements and radio frequency-baseband processing channels, thus resulting in a considerable burden on both a device cost, and the complexity of baseband processing. This becomes particularly prominent in a high frequency band and a large bandwidth. In order to lower the implementation cost and the device complexity of the massive MIMO technologies, the hybrid digital and analog beam-forming technology has been recently proposed.

As illustrated in FIG. 1, the hybrid digital and analog beam-forming refers to Digital Beam-Forming (DBF) plus an additional level of beam-forming, i.e., Analog Beam-Forming (ABF), on a radio frequency signal proximate a front end of an antenna system. With analog beam-forming, a signal to be transmitted can be roughly matched with a channel simply. The dimension of an equivalent digital channel resulting from the analog beam-forming is less than the real number of antennas, so that the numbers of AD/DA conversion elements and digital channels, and corresponding complexity of baseband processing can be greatly lowered. Interference of residual analog beam-forming can be handled in the digital domain to thereby guarantee the quality of MU-MIMO transmission.

As compared with fully-digital beam-forming, hybrid digital and analog beam-forming is a solution with a tradeoff between the performance and the complexity, and has a promising application prospect in a system operating in a high frequency band and in a high bandwidth, or with a large number of antennas.

In the MIMO technologies, and particularly the MU-MIMO technologies, the precision of pre-coding/beam-forming, and the efficiency of a scheduling algorithm depends directly upon, and thus the performance of the system as a whole is affected by, the precision of channel state information obtained at the network side, so how to obtain the channel state information is one of the core issues in the standardization of the MIMO technologies.

In the existing LTE signal structure, a channel can be estimated according to a reference signal in a baseband signal to obtain a channel state required for digital beam-forming. Since a plurality of analog channels in the part of analog beam-forming are equivalent to a digital channel, the number of digital channels is less than the real number of antennas, and the dimension of a channel matrix obtained by estimating the digital channel using the reference signal is far lower than the dimension of a channel matrix at the antenna end, so channel state information available in the digital domain cannot be used directly for the part of analog beam-forming. Furthermore since the reference signal corresponds to the digital channel, channel state information of the analog channels cannot be measured directly according to the reference signal in the case that the number of analog channels is inconsistent with the number of digital channels.

SUMMARY

Embodiments of the invention provide a method for measuring an analog channel, and a base station so as to measure an analog channel in a hybrid digital and analog beam-forming system.

Particular technical solutions according to the embodiments of the invention are as follows.

Embodiments of the invention provide a method for measuring an analog channel, the method including: receiving, by a base station, a reference signal, wherein the base station includes a hybrid digital and analog beam-forming antenna system including digital channels and analog channels; and selecting, by the base station, a group of analog channels from a set of groups of analog channels according to the reference signal, and measuring each analog channel in the selected group of analog channels using the reference signal, wherein the number of analog channels in each group of analog channels is equal to the number of digital channels in the hybrid digital and analog beam-forming antenna system.

In a possible implementation, selecting, by the base station, the group of analog channels from the set of groups of analog channels according to the reference signal includes: selecting, by the base station, a group of analog channels, corresponding to a time resource occupied for receiving the reference signal, from the set of groups of analog channels according to the time resource.

In a possible implementation, selecting, by the base station, the group of analog channels from the set of groups of analog channels according to the reference signal includes: determining, by the base station, a frequency at which the reference signal is transmitted, and selecting a group of analog channels corresponding to the frequency from the set of groups of analog channels.

In a possible implementation, selecting, by the base station, the group of analog channels from the set of groups of analog channels according to the reference signal includes: selecting, by the base station, a subset of groups of analog channels, corresponding to a time resource occupied for receiving the reference signal, from the set of groups of analog channels according to the time resource, wherein the subset of groups of analog channels includes a preset number of groups of analog channels; and determining, by the base station, a frequency at which the reference signal is transmitted, and selecting a group of analog channels corresponding to the frequency from the selected subset of groups of analog channels.

In a possible implementation, the analog channels in the hybrid digital and analog beam-forming antenna system are grouped into the set of groups of analog channels, and the analog channels in each group of analog channels do not overlap with those in any other group of analog channels.

In a possible implementation, the method further includes: keeping, by the base station, all the other analog channels in the hybrid digital and analog beam-forming antenna system than the analog channels in the selected group of analog channels disabled, when measuring each analog channel in the selected group of analog channels using the reference signal.

In a possible implementation, the base station and a UE agree on the time resource occupied by the reference signal in advance.

In a possible implementation, the base station and a UE agree on the frequency, at which the reference signal is transmitted, in advance.

Embodiments of the invention further provide a base station including: a receiving module configured to receive a reference signal, wherein the base station includes a hybrid digital and analog beam-forming antenna system including digital channels and analog channels; and a processing module configured to select a group of analog channels from a set of groups of analog channels according to the reference signal, and to measure each analog channel in the selected group of analog channels using the reference signal, wherein the number of analog channels in each group of analog channels is equal to the number of digital channels in the hybrid digital and analog beam-forming antenna system.

In a possible implementation, the processing module is configured to select a group of analog channels, corresponding to a time resource occupied for receiving the reference signal, from the set of groups of analog channels according to the time resource.

In a possible implementation, the processing module is configure to determine a frequency at which the reference signal is transmitted, and to select a group of analog channels corresponding to the frequency from the set of groups of analog channels.

In a possible implementation, the processing module is configured to select a subset of groups of analog channels, corresponding to a time resource occupied for receiving the reference signal, from the set of groups of analog channels according to the time resource, wherein the subset of groups of analog channels includes a preset number of groups of analog channels; and to determine a frequency at which the reference signal is transmitted, and to select a group of analog channels corresponding to the frequency from the selected subset of groups of analog channels.

In a possible implementation, the analog channels in the hybrid digital and analog beam-forming antenna system are grouped into the set of groups of analog channels, and the analog channels in each group of analog channels do not overlap with those in any other group of analog channels.

In a possible implementation, the processing module is further configured to keep all the other analog channels in the hybrid digital and analog beam-forming antenna system than the analog channels in the selected group of analog channels disabled, when measuring each analog channel in the selected group of analog channels using the reference signal.

In a possible implementation, the base station and a UE agree on the time resource occupied by the reference signal in advance.

In a possible implementation, the base station and a UE agree on the frequency, at which the reference signal is transmitted, in advance.

Embodiments of the invention further provide another base station including a processor, a memory, and a transceiver, wherein the transceiver is configured to be controlled by the processor to receive and transmit data, the memory stores preset programs, and the processor is configured to read the programs stored in the memory to execute following operations: receiving a reference signal through the transceiver, wherein the base station includes a hybrid digital and analog beam-forming antenna system including digital channels and analog channels; and selecting a group of analog channels from a set of groups of analog channels according to the reference signal, and measuring each analog channel in the selected group of analog channels using the reference signal, wherein the number of analog channels in each group of analog channels is equal to the number of digital channels in the hybrid digital and analog beam-forming antenna system.

In a possible implementation, the processor is configured to select a group of analog channels, corresponding to a time resource occupied for receiving the reference signal, from the set of groups of analog channels according to the time resource.

In a possible implementation, the processor is configured to determine a frequency at which the reference signal is transmitted, and to select a group of analog channels corresponding to the frequency from the set of groups of analog channels.

In a possible implementation, the processor is configured to select a subset of groups of analog channels, corresponding to a time resource occupied for receiving the reference signal, from the set of groups of analog channels according to the time resource, wherein the subset of groups of analog channels includes a preset number of groups of analog channels; and to determine a frequency at which the reference signal is transmitted, and to select a group of analog channels corresponding to the frequency from the selected subset of groups of analog channels.

In a possible implementation, the analog channels in the hybrid digital and analog beam-forming antenna system are grouped into the set of groups of analog channels, and the analog channels in each group of analog channels do not overlap with those in any other group of analog channels.

In a possible implementation, the processor is configured to keep all the other analog channels in the hybrid digital and analog beam-forming antenna system than the analog channels in the selected group of analog channels disabled, when measuring each analog channel in the selected group of analog channels using the reference signal.

In a possible implementation, the base station and a UE agree on the time resource occupied by the reference signal in advance.

In a possible implementation, the base station and a UE agree on the frequency, at which the reference signal is transmitted, in advance.

With the technical solutions above, in the embodiments of the invention, the analog channels in the hybrid digital and analog beam-forming antenna system are grouped, the number of analog channels in each group of analog channels is equal to the number of digital channels in the hybrid digital and analog beam-forming antenna system, and the base station selects a group of analog channels from the set of groups of analog channels according to the reference signal, and measures each analog channel in the selected group of analog channels using the reference signal, so that the analog channels in the hybrid digital and analog beam-forming antenna system can be measured.

DETAILED DESCRIPTION OF THE EMBODIMENTS

In order to make the objects, technical solutions, and advantages of embodiments of the invention more apparent, the invention will be described below in further details with reference to the drawings, and apparently the embodiments to be described are only a part but not all of the embodiments of the invention. Based upon the embodiments here of the invention, all the other embodiments which can occur to those ordinarily skilled in the art without any inventive effort shall fall into the scope of the invention.

Analog channels correspond to antenna channels in a one-to-one manner in the following embodiments.

Figure 1:
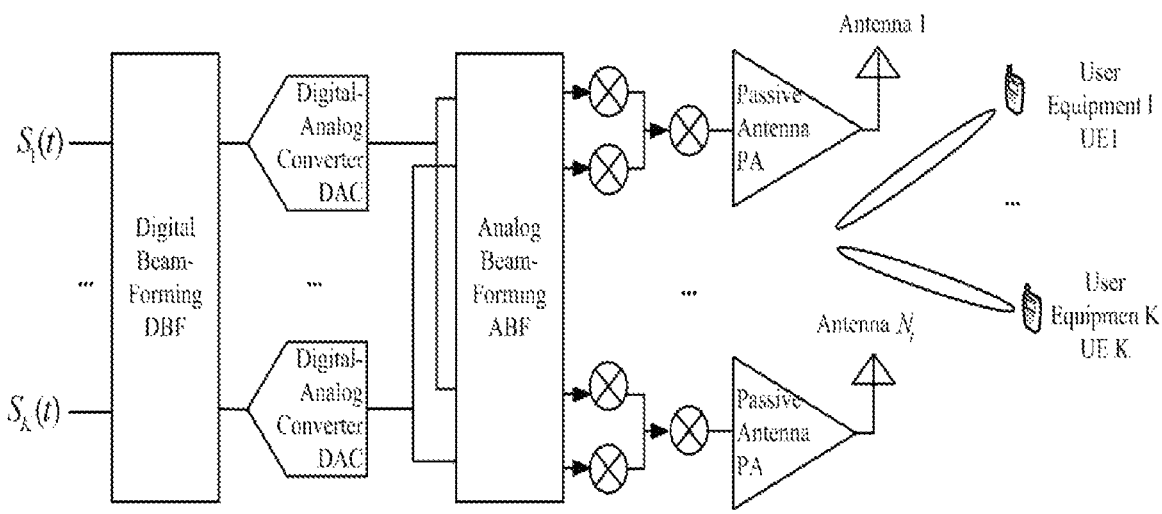
FIG. 1 is a schematic structural diagram of a hybrid digital and analog beam-forming antenna system.
Figure 2:
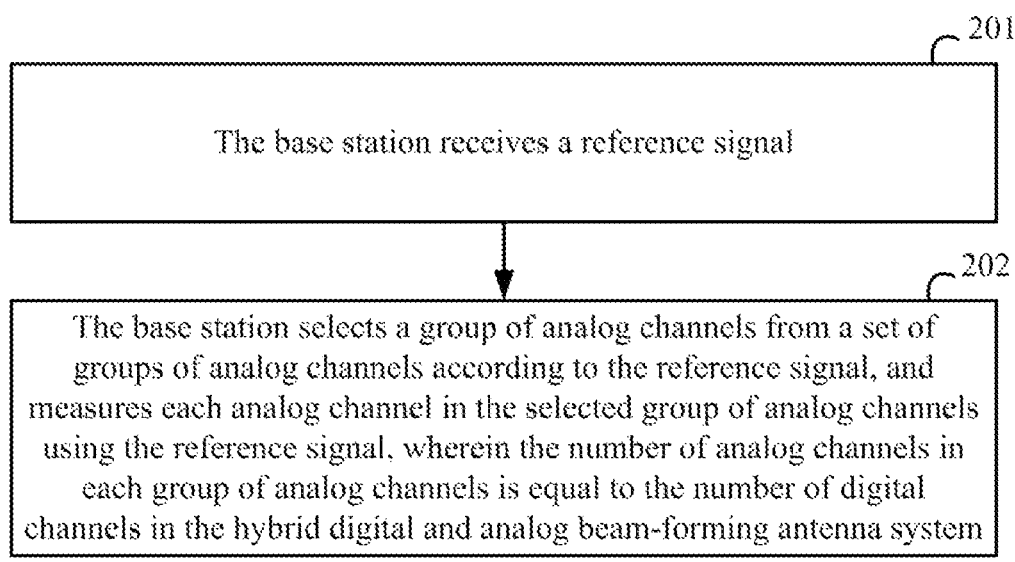
FIG. 2 is a schematic diagram of a process of measuring an analog channel by a base station according to embodiments of the invention.

FIG. 2 illustrates a detailed flow chart of a method for measuring an analog channel in a hybrid digital and analog beam-forming antenna system by a base station according to the embodiments of the invention as follows.

In the operation 201, the base station receives a reference signal.

Here the base station includes the hybrid digital and analog beam-forming antenna system including digital channels and analog channels.

In an implementation, the base station and a UE agree on the reference signal in advance.

In the operation 202, the base station selects a group of analog channels from a set of groups of analog channels according to the reference signal, and measures each analog channel in the selected group of analog channels using the reference signal, where the number of analog channels in each group of analog channels is equal to the number of digital channels in the hybrid digital and analog beam-forming antenna system.

In an implementation, the base station measures each analog channel in the selected group of analog channels using the reference signal while all the other analog channels in the hybrid digital and analog beam-forming antenna system than the analog channels in the selected group of analog channels remain disabled.

In an implementation, the analog channels in the hybrid digital and analog beam-forming antenna system are grouped into one or more groups of analog channels constituting the set of groups of analog channels; where the analog channels in each group of analog channels do not overlap with those in any other group of analog channels, and the number of analog channels in each group of analog channels is the same and is equal to the number of digital channels in the hybrid digital and analog beam-forming antenna system. In the embodiments of the invention, if there are M digital channels and $N_t$ analog channels in the hybrid digital and analog beam-forming antenna system, then the analog channels may be grouped into $N_a$ groups of analog channels, where $N_a=N_t/M$.

In the embodiments of the invention, the base station selects the group of analog channels from the set of groups of analog channels according to the reference signal in the following three implementations without any limitation thereto.

In a first implementation, the base station selects a group of analog channels, corresponding to a time resource occupied by the reference signal, from the set of groups of analog channels according to the time resource occupied for receiving the reference signal.

Here the base station and the UE agree on the time resource occupied by the reference signal in advance.

Figure 3:
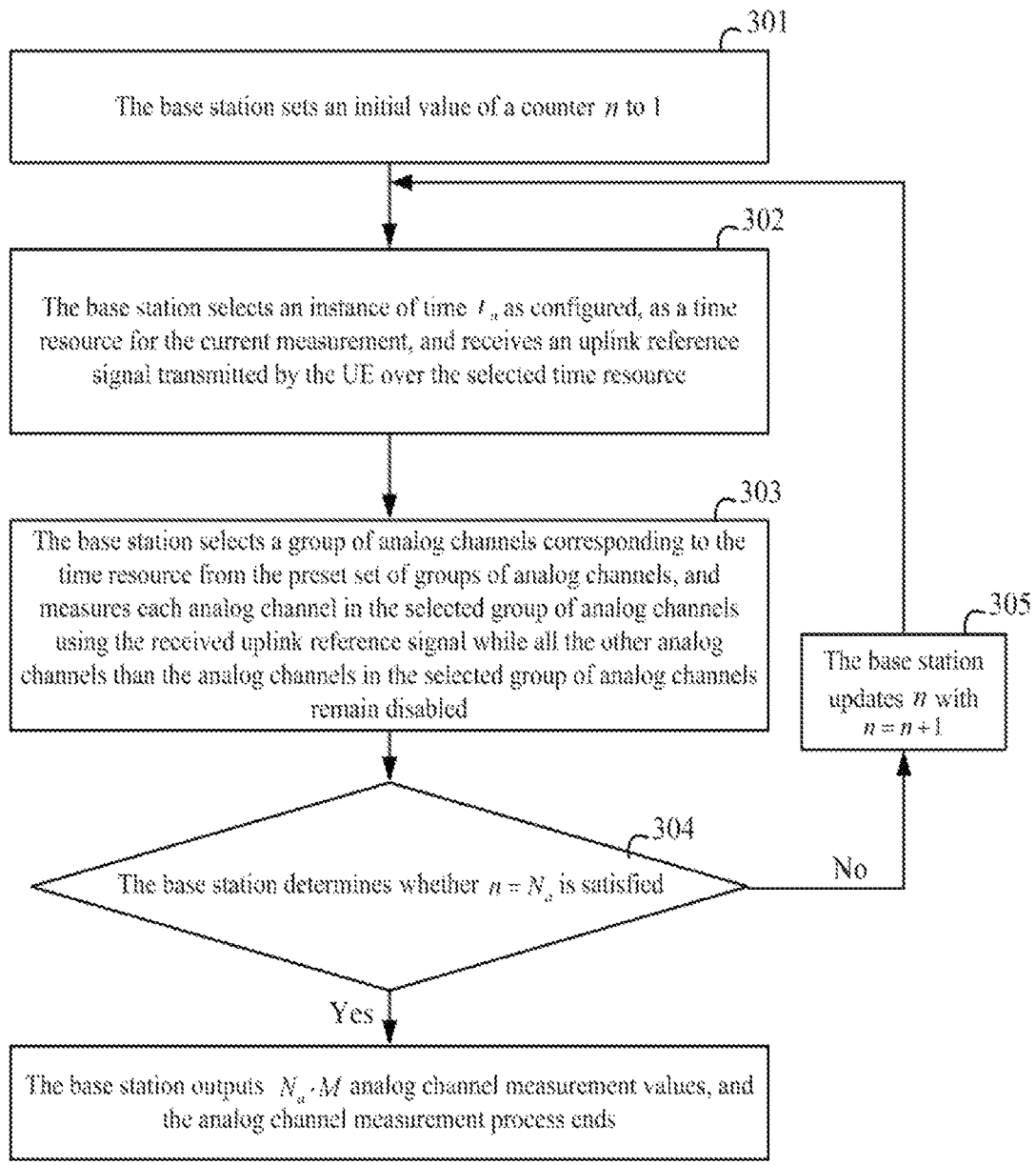
FIG. 3 is a schematic diagram of a process of selecting and measuring a group of analog channels by a base station according to a time resource according to the embodiments of the invention.

Particularly FIG. 3 illustrates of the process of selecting and measuring the group of analog channels by the base station according to the time resource occupied for receiving the reference signal as follows.

In the operation 301, the base station sets an initial value of a counter n to 1.

In the operation 302, the base station selects an instance of time $t_n$ as configured, as a time resource for the current measurement, and receives an uplink reference signal transmitted by the UE over the selected time resource.

In the operation 303, the base station selects a group of analog channels corresponding to the time resource from the preset set of groups of analog channels, and measures each analog channel in the selected group of analog channels using the received uplink reference signal while all the other analog channels than the analog channels in the selected group of analog channels remain disabled.

In the operation 304, the base station determines whether $n=N_a$ is satisfied, and if so, then the base station outputs n·M analog channel measurement values, and the analog channel measurement process will end; otherwise, the flow will proceed to the operation 305.

In the operation 305, the base station updates n with n=n+1, and goes back to the operation 302.

In a second implementation, the base station receives the reference signal transmitted by the UE, and the base station determines a frequency at which the reference signal is transmitted, and selects a group of analog channels, corresponding to the frequency at which the reference signal is transmitted, from the set of groups of analog channels.

Here the base station and the UE agree on the frequency, at which the reference signal is transmitted, in advance.

Particularly the base station receives the reference signal, and if it is determined that the frequency at which the reference signal is transmitted lies in a frequency range $f_1$, then the base station will select the group of analog channels corresponding to the frequency range $f_1$ from the set of groups of analog channels, and measure each analog channel in the selected group of analog channels using the reference signal while all the other analog channels than the analog channels in the selected group of analog channels remain disabled. The frequency at which the reference signal is transmitted by the UE is set, and the frequency range corresponding to the group of analog channels is set, so that each analog channel in each group of analog channels in the set of groups of analog channels can be measured.

In a third implementation, the base station selects a subset of groups of analog channels corresponding to the time resource occupied by the reference signal from the groups of analog channels, according to the time resource occupied for receiving the reference signal; where the subset of groups of analog channels includes a preset number of groups of analog channels; and the base station determines a frequency at which the reference signal is transmitted, and selects a group of analog channels, corresponding to the frequency at which the reference signal is transmitted, from the selected subset of groups of analog channels.

Here the base station and the UE agree on the time resource occupied by the reference signal in advance, and the base station and the UE agree on the frequency, at which the reference signal is transmitted, in advance.

Here the subset of groups of analog channels includes a preset number of groups of analog channels, and each subset of groups of analog channels includes a same number of groups of analog channels.

Figure 4:
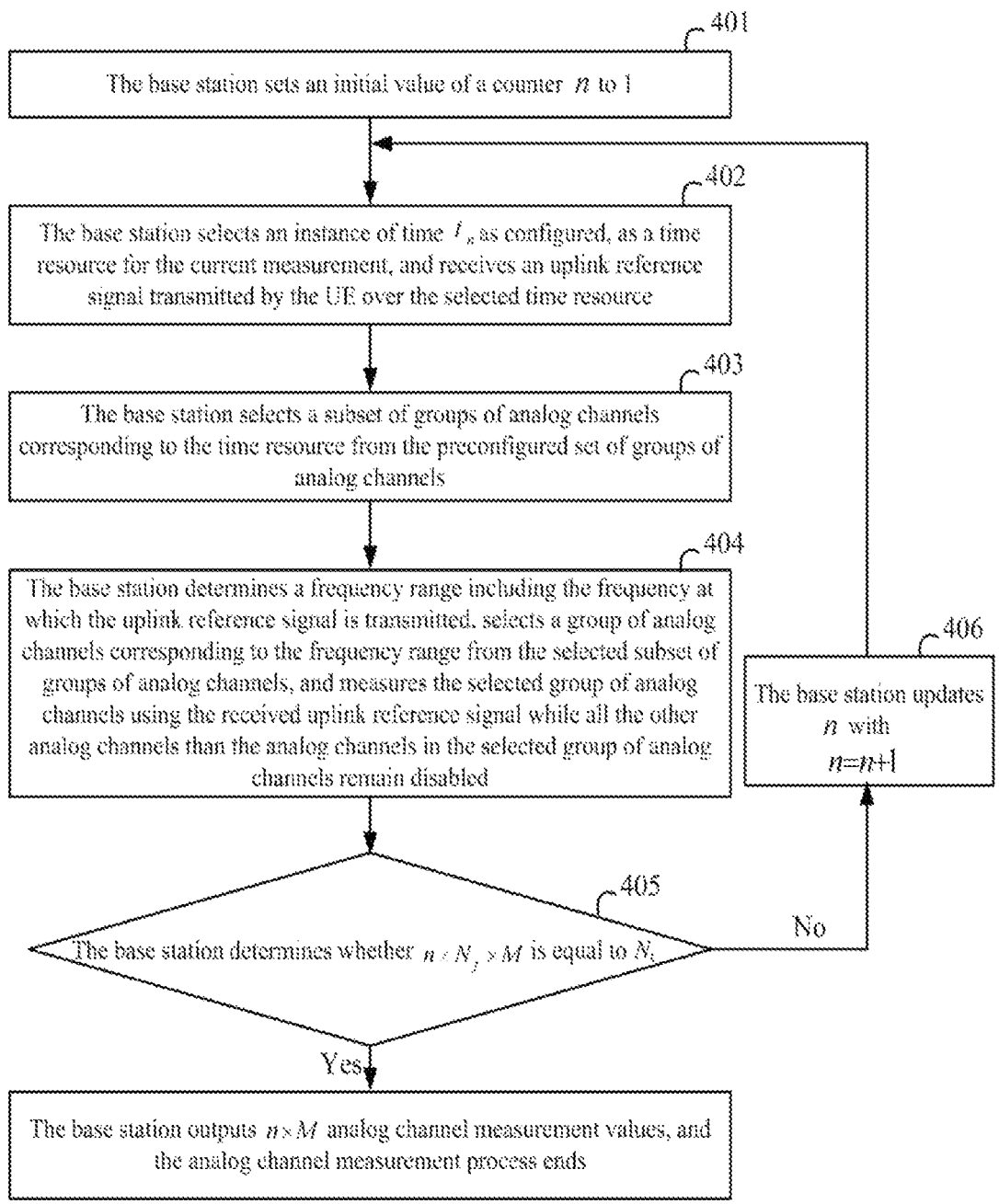
FIG. 4 is a schematic diagram of a process of selecting and measuring a group of analog channels by a base station according to time and frequency resources according to the embodiments of the invention.

Particularly FIG. 4 illustrates of the process of selecting and measuring the group of analog channels by the base station according to the time resource occupied for receiving the reference signal, and the frequency at which the reference signal is transmitted, as follows.

In the operation 401, the base station sets an initial value of a counter n to 1.

In the operation 402, the base station selects an instance of time $t_n$ as configured, as a time resource for the current measurement, and receives an uplink reference signal transmitted by the UE over the selected time resource, where a frequency at which the reference signal is transmitted can correspond to a plurality of preset different frequency ranges, and each frequency range corresponds to one group of analog channels.

In the operation 403, the base station selects a subset of groups of analog channels corresponding to the time resource from the preconfigured set of groups of analog channels, where there are $N_f$ groups of analog channels in the subset of groups of analog channels, and there are M analog channels in each group of analog channels, for example.

In the operation 404, the base station determines a frequency range including the frequency at which the uplink reference signal is transmitted, selects a group of analog channels corresponding to the frequency range from the selected subset of groups of analog channels, and measures the selected group of analog channels using the received uplink reference signal while all the other analog channels than the analog channels in the selected group of analog channels remain disabled.

In the operation 405, the base station determines whether $n \times N_f \times M$ is equal to $N_t$, and if so, then the base station outputs $n \times N_f \times M$ analog channel measurement values, and the analog channel measurement process will end; otherwise, the flow will proceed to the operation 406.

In the operation 406, the base station updates n with n=n+1, and goes back to the operation 402.

Here the reference signal received by the base station over the same time resource can be used to measure the analog channels in the groups of analog channels corresponding to the different frequency ranges, that is, the plurality of groups of analog channels corresponding to the different frequency ranges can be measured at the same time, so that the analog channels in the plurality of groups of analog channels can be measured at the same time to thereby shorten a period of time required for the measurement.

With the technical solution above, in the embodiments of the invention, the analog channels in the hybrid digital and analog beam-forming antenna system are grouped, the number of analog channels in each group of analog channels is equal to the number of digital channels in the hybrid digital and analog beam-forming antenna system, and the base station selects a group of analog channels from the set of groups of analog channels according to the reference signal, and measures each analog channel in the selected group of analog channels using the reference signal, so that the analog channels in the hybrid digital and analog beam-forming antenna system can be measured.

Figure 5:
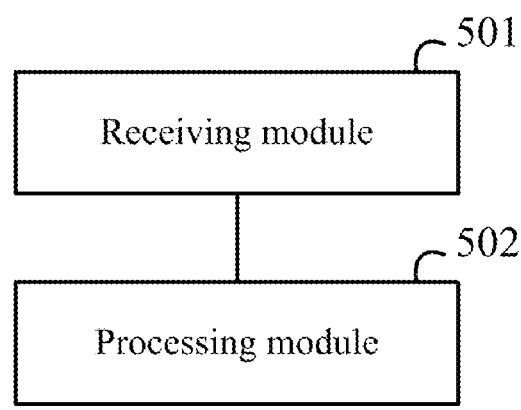
FIG. 5 is a schematic structural diagram of a base station according to the embodiments of the invention.

Based upon the same inventive concept, the embodiments of the invention further provide a base station, and reference can be made to the description of the embodiments of the method above for a particular implementation of the base station, so a repeated description thereof will be omitted here; and as illustrated in FIG. 5, the base station generally includes following modules.

A receiving module 501 is configured to receive a reference signal, where the base station includes a hybrid digital and analog beam-forming antenna system including digital channels and analog channels.

A processing module 502 is configured to select a group of analog channels from a set of groups of analog channels according to the reference signal, and to measure each analog channel in the selected group of analog channels using the reference signal, where the number of analog channels in each group of analog channels is equal to the number of digital channels in the hybrid digital and analog beam-forming antenna system.

In a first particular implementation, the processing module is configured to select a group of analog channels, corresponding to a time resource occupied for receiving the reference signal, from the set of groups of analog channels according to the time resource.

In a second particular implementation, the processing module is configured to determine a frequency at which the reference signal is transmitted, and to select a group of analog channels corresponding to the frequency from the set of groups of analog channels.

In a third particular implementation, the processing module is configured to select a subset of groups of analog channels, corresponding to a time resource occupied for receiving the reference signal, from the set of groups of analog channels according to the time resource, where the subset of groups of analog channels includes a preset number of groups of analog channels; and to determine a frequency at which the reference signal is transmitted, and to select a group of analog channels corresponding to the frequency from the selected subset of groups of analog channels.

In an implementation, the analog channels in the hybrid digital and analog beam-forming antenna system are grouped into the set of groups of analog channels, where the analog channels in each group of analog channels do not overlap with those in any other group of analog channels.

In an implementation, the processing module is further configured to keep all the other analog channels in the hybrid digital and analog beam-forming antenna system than the analog channels in the selected group of analog channels disabled, when measuring each analog channel in the selected group of analog channels using the reference signal.

In an implementation, the base station and a UE agree on the time resource occupied by the reference signal in advance.

In an implementation, the base station and a UE agree on the frequency, at which the reference signal is transmitted, in advance.

Figure 6:
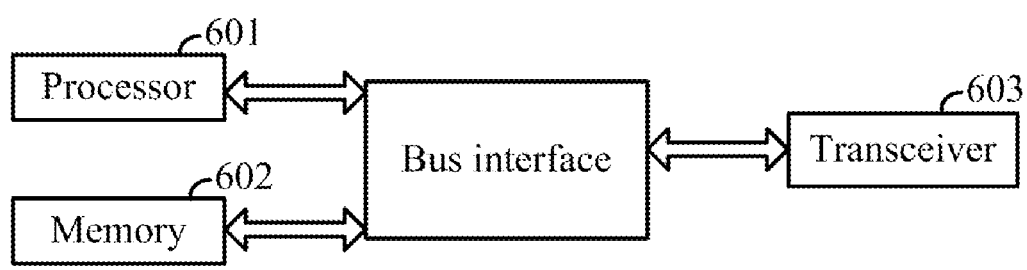
FIG. 6 is a schematic structural diagram of another base station according to the embodiments of the invention.

Based upon the same inventive concept, the embodiments of the invention further provide another base station, and reference can be made to the description of the embodiments of the method above for a particular implementation of the base station, so a repeated description thereof will be omitted here; and as illustrated in FIG. 6, the base station generally includes a processor 601, a memory 602, and a transceiver 603, where the transceiver 603 is configured to be controlled by the processor 601 to receive and transmit data, the memory 602 stores preset programs, and the processor 601 is configured to read the programs stored in the memory 602 to execute following operations.

Receiving a reference signal through the transceiver, where the base station includes a hybrid digital and analog beam-forming antenna system including digital channels and analog channels; and selecting a group of analog channels from a set of groups of analog channels according to the reference signal, and measuring each analog channel in the selected group of analog channels using the reference signal; where the number of analog channels in each group of analog channels is equal to the number of digital channels in the hybrid digital and analog beam-forming antenna system.

In a first particular implementation, the processor is configured to select a group of analog channels, corresponding to a time resource occupied for receiving the reference signal, from the set of groups of analog channels according to the time resource.

In a second particular implementation, the processor is configured to determine a frequency at which the reference signal is transmitted, and to select a group of analog channels corresponding to the frequency from the set of groups of analog channels.

In a third particular implementation, the processor is configured to select a subset of groups of analog channels, corresponding to a time resource occupied for receiving the reference signal, from the set of groups of analog channels according to the time resource, where the subset of groups of analog channels includes a preset number of groups of analog channels; and to determine a frequency at which the reference signal is transmitted, and to select a group of analog channels corresponding to the frequency from the selected subset of groups of analog channels.

In an implementation, the analog channels in the hybrid digital and analog beam-forming antenna system are grouped into the set of groups of analog channels, where the analog channels in each group of analog channels do not overlap with those in any other group of analog channels.

In an implementation, the processor is configured to keep all the other analog channels in the hybrid digital and analog beam-forming antenna system than the analog channels in the selected group of analog channels disabled, when measuring each analog channel in the selected group of analog channels using the reference signal.

In an implementation, the base station and a UE agree on the time resource occupied by the reference signal in advance.

In an implementation, the base station and a UE agree on the frequency, at which the reference signal is transmitted, in advance.

Here the processor, the memory, and the transceiver are connected through a bus, and the bus architecture can include any number of interconnecting buses and bridges to particularly link together various circuits including one or more processors represented by the processor, and one or more memories represented by the memory. The bus architecture can further link together various other circuits, e.g., a peripheral devices, a manostat, a power management circuit, etc., all of which are well known in the art, so a further description thereof will be omitted in this context. The bus interface serves as an interface. The transceiver can include a number of elements, i.e., a transmitter and a receiver, and provide units configured to communicate various other devices over a transmission medium. The processor is responsible for managing the bus architecture and performing normal processes, and the memory can store data for use by the processor in performing the operations.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for measuring an analog channel, the method comprising:
    receiving, by a base station, a reference signal, wherein the base station comprises a hybrid digital and analog beam-forming antenna system comprising digital channels and analog channels; and
    selecting, by the base station, a group of analog channels from a set of groups of analog channels according to the reference signal, and measuring each analog channel in the selected group of analog channels using the reference signal, wherein a number of analog channels in each group of analog channels is equal to a number of digital channels in the hybrid digital and analog beam-forming antenna system.

2. The method according to claim 1, wherein selecting, by the base station, the group of analog channels from the set of groups of analog channels according to the reference signal comprises:
    selecting, by the base station, a group of analog channels, corresponding to a time resource occupied for receiving the reference signal, from the set of groups of analog channels according to the time resource.

3. The method according to claim 1, wherein selecting, by the base station, the group of analog channels from the set of groups of analog channels according to the reference signal comprises:
    determining, by the base station, a frequency at which the reference signal is transmitted, and selecting a group of analog channels corresponding to the frequency from the set of groups of analog channels.

4. The method according to claim 1, wherein selecting, by the base station, the group of analog channels from the set of groups of analog channels according to the reference signal comprises:
    selecting, by the base station, a subset of groups of analog channels, corresponding to a time resource occupied for receiving the reference signal, from the set of groups of analog channels according to the time resource, wherein the subset of groups of analog channels comprises a preset number of groups of analog channels; and
    determining, by the base station, a frequency at which the reference signal is transmitted, and selecting a group of analog channels corresponding to the frequency from the selected subset of groups of analog channels.

5. The method according to claim 1, wherein the analog channels in the hybrid digital and analog beam-forming antenna system are grouped into the set of groups of analog channels;
    wherein the analog channels in each group of analog channels do not overlap with those in any other group of analog channels.

6. The method according to claim 1, wherein the method further comprises:
    keeping, by the base station, other analog channels in the hybrid digital and analog beam-forming antenna system disabled, when measuring each analog channel in the selected group of analog channels using the reference signal, wherein the other analog channels are analog channels in the hybrid digital and analog beam-forming antenna system other than analog channels comprised in the selected group of analog channels.

7. The method according to claim 2, wherein the base station and a user equipment agree on the time resource occupied by the reference signal in advance.

8. The method according to claim 3, wherein the base station and a user equipment agree on the frequency, at which the reference signal is transmitted, in advance.

9. A base station, comprising at least one processor and a memory; wherein the memory is configured to store computer readable program codes, and the at least one processor is configured to execute the computer readable program codes to:
    receive a reference signal, wherein the base station comprises a hybrid digital and analog beam-forming antenna system comprising digital channels and analog channels; and
    select a group of analog channels from a set of groups of analog channels according to the reference signal, and to measure each analog channel in the selected group of analog channels using the reference signal, wherein a number of analog channels in each group of analog channels is equal to a number of digital channels in the hybrid digital and analog beam-forming antenna system.

10. The base station according to claim 9, wherein the at least one processor is further configured to execute the computer readable program codes to:

select a group of analog channels, corresponding to a time resource occupied for receiving the reference signal, from the set of groups of analog channels according to the time resource.

11. The base station according to claim 9, wherein the at least one processor is further configured to execute the computer readable program codes to:

determine a frequency at which the reference signal is transmitted, and to select a group of analog channels corresponding to the frequency from the set of groups of analog channels.

12. The base station according to claim 9, wherein the at least one processor is further configured to execute the computer readable program codes to:

select a subset of groups of analog channels, corresponding to a time resource occupied for receiving the reference signal, from the set of groups of analog channels according to the time resource, wherein the subset of groups of analog channels comprises a preset number of groups of analog channels; and determine a frequency at which the reference signal is transmitted, and to select a group of analog channels corresponding to the frequency from the selected subset of groups of analog channels.

13. The base station according to claim 9, wherein the analog channels in the hybrid digital and analog beam-forming antenna system are grouped into the set of groups of analog channels; wherein the analog channels in each group of analog channels do not overlap with those in any other group of analog channels.

14. The base station according to claim 9, wherein the at least one processor is further configured to execute the computer readable program codes to:

keep other analog channels in the hybrid digital and analog beam-forming antenna system disabled, when measuring each analog channel in the selected group of analog channels using the reference signal, wherein the other analog channels are analog channels in the hybrid digital and analog beam-forming antenna system other than analog channels comprised in the selected group of analog channels.

15. The base station according to claim 10, wherein the base station and a user equipment agree on the time resource occupied by the reference signal in advance.

16. The base station according to claim 11, wherein the base station and a user equipment agree on the frequency, at which the reference signal is transmitted, in advance.

17. The method according to claim 4, wherein the base station and a user equipment agree on the time resource occupied by the reference signal in advance.

18. The method according to claim 4, wherein the base station and a user equipment agree on the frequency, at which the reference signal is transmitted, in advance.

19. The base station according to claim 12, wherein the base station and a user equipment agree on the time resource occupied by the reference signal in advance.

20. The base station according to claim 12, wherein the base station and a user equipment agree on the frequency, at which the reference signal is transmitted, in advance.

* * * * *